United States Patent
Miyazaki et al.

(10) Patent No.: US 7,035,490 B2
(45) Date of Patent: Apr. 25, 2006

(54) ACTIVE DIFFRACTION GRATING

(75) Inventors: Shun-ichi Miyazaki, Musashino (JP); Akira Miura, Musashino (JP); Shinji Kobayashi, Musashino (JP); Morio Wada, Musashino (JP); Tsuyoshi Yakihara, Musashino (JP); Sadaharu Oka, Musashino (JP); Shinji Iio, Musashino (JP); Tadashige Fujita, Musashino (JP); Chie Sato, Musashino (JP)

(73) Assignee: Yokogawa Electric Corp., Tokyo (JP)

( * ) Notice: Subject to any disclaimer, the term of this patent is extended or adjusted under 35 U.S.C. 154(b) by 0 days.

(21) Appl. No.: 10/826,343

(22) Filed: Apr. 19, 2004

(65) Prior Publication Data

US 2004/0213499 A1  Oct. 28, 2004

(30) Foreign Application Priority Data

Apr. 24, 2003  (JP) .............................. 2003-119323

(51) Int. Cl.
    *G02F 1/295* (2006.01)

(52) U.S. Cl. ................................ 385/10; 385/2; 385/8

(58) Field of Classification Search .................. 385/10
    See application file for complete search history.

(56) References Cited

U.S. PATENT DOCUMENTS 6,865,310 B1 * 3/2005 Yokouchi ..................... 385/16

FOREIGN PATENT DOCUMENTS

| JP | 7-173649 | 7/1995 |
| JP | 8-320506 | 12/1996 |

* cited by examiner

*Primary Examiner*—Juliana Kang
(74) *Attorney, Agent, or Firm*—Westerman, Hattori, Daniels & Adrian LLP

(57) ABSTRACT

When a voltage is applied to plural spot electrodes selected from the spot electrodes arranged in the matrix form and the light incident on the two-dimensional plane waveguide is reflected by at least two parallel lines, the refractive index of the optical waveguide is partly changed so that the wavelength of the light, the angle of the two lines to the incident light and the distance between the lines satisfy the Bragg reflection condition.

4 Claims, 5 Drawing Sheets

2 : Stripe-shaped recesses and protrusions

1 : Substrate

3 : Triangular recesses and protrusions

1a : Semiconductor substrate

Spot electrodes to which voltage is applied are caused to function as one line

ACTIVE DIFFRACTION GRATING

BACKGROUND OF THE INVENTION

1. Field of the Invention

This invention relates to an active diffraction grating that can be suitably used in an optical switch or the like for high-speed optical communication.

2. Description of the Related Art

Diffraction gratings on conventional semiconductor substrates are prepared by forming grooves at a constant spacing using an optical molding technique or micro-scale device technique, or by direct writing with electron beams.

FIGS. 1A and 1B are enlarged sectional views showing essential parts of such conventional diffraction gratings.

In FIG. 1A, a substrate 1 is made of a material such as metal or ceramics, and stripe-like recesses and protrusions 2 are formed on the substrate 1 by photolithography and etching.

FIG. 1B shows another conventional example. In this example, triangular recesses and protrusions 3 having a triangular cross section are formed on the top of a semiconductor substrate 1a by similar techniques.

The conventional techniques for preparing stripe-like recesses and protrusions or recesses and protrusions having a triangular cross section on the top of the metal or ceramic substrate 1 or the semiconductor substrate 1a are described in the following references:

Patent Reference 1: JP-A-7-173649
Patent Reference 2: JP-A-8-320506

However, in the diffraction gratings prepared by these methods, the spacing between grooves is constant, and the positions where the diffraction gratings are formed are fixed with respect to the direction of incident light beams. Therefore, there is a problem that these diffraction gratings cannot cope with changes in incident wavelength and changes in incident angle.

SUMMARY OF THE INVENTION

In view of the foregoing problem, it is an object of this invention to provide an active diffraction grating that is formed by a two-dimensional diffraction grating on a semiconductor substrate and that can freely control the direction of diffraction and the intensity of diffracted light.

An active diffraction grating according to this invention comprises an optical waveguide formed on a two-dimensional plane and electrodes formed on both sides of the optical waveguide, wherein one of the electrodes is formed as plural spot electrodes at a constant spacing in a matrix form on the two-dimensional plane. With respect to the size of the spot electrodes and the distance between the spot electrodes, the spot electrodes are small and dense enough to function as a line when the spot electrodes are arrayed in a straight line within the diameter of light incident on the optical waveguide. The spot electrodes are formed to form at least two parallel lines having a predetermined angle to the traveling direction of the light incident on the optical waveguide.

When a voltage is applied to plural spot electrodes selected from the spot electrodes arranged in the matrix form and the light incident on the two-dimensional plane waveguide is reflected by said at least two parallel lines, the refractive index of the optical waveguide is partly changed so that the wavelength of the light, the angle of the two lines to the incident light and the distance between the lines satisfy the Bragg reflection condition.

DETAILED DESCRIPTION OF THE PREFERRED EMBODIMENTS

An exemplary embodiment of the active diffraction grating according to this invention will now be described with reference to the drawings.

Figure 1A:
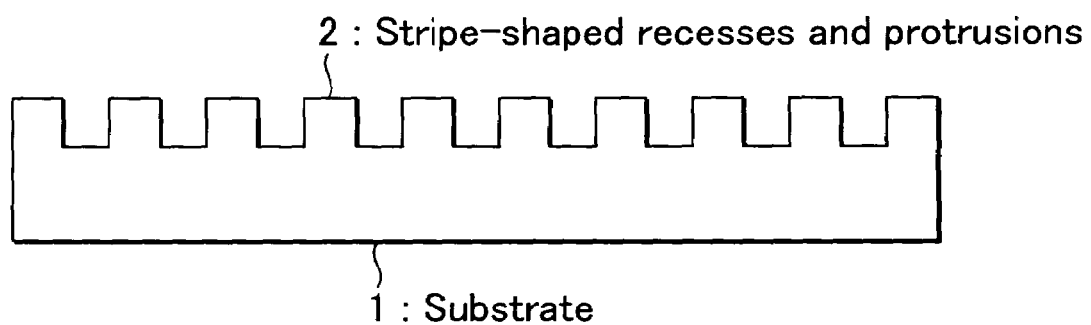
FIGS. 1A and 1B are sectional views showing conventional examples.
Figure 1B:
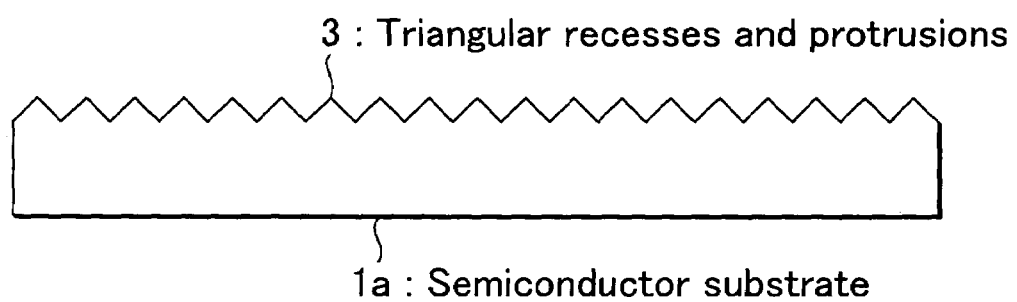
Figure 2A:
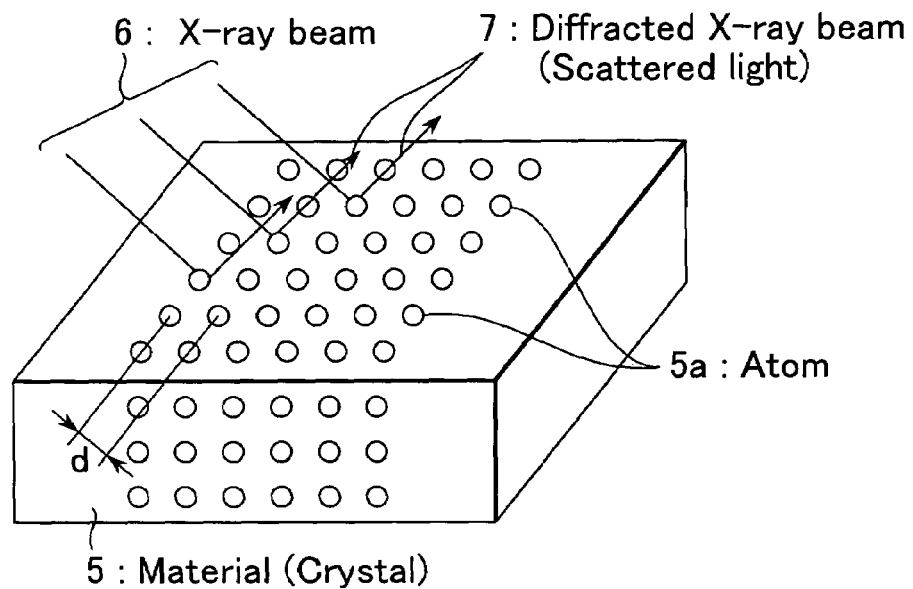
FIGS. 2A and 2B are explanatory views showing the operation principle of this invention.

First, the "Bragg diffraction condition", which is the basis of this invention, will be described with reference to FIGS. 2A and 2B. As shown in FIG. 2A, when X-ray beams 6 become incident on a certain material (crystal) 5, atoms 5a arrayed in a lattice form in the crystal scatter a part of the incident X-ray beams.

The scattered X-ray beams from the individual atoms interfere with each other and intensify each other in a specific direction, generating diffracted X-ray beams 7. The condition for providing the diffracted X-ray beams 7 is the Bragg diffraction condition.

Figure 2B:
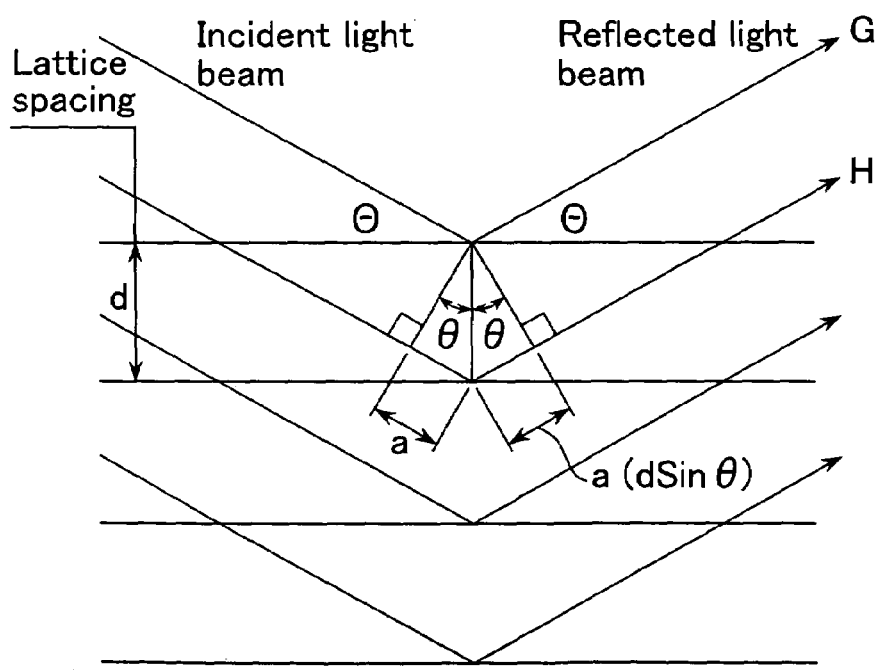

That is, as shown in FIG. 2B, when light with a constant wavelength $\lambda$ becomes incident on the lattice plane (in this case, the arrays of atoms arranged in the lattice form are shown as lines), diffracted light beams intensify each other under such conditions that satisfy the following Bragg diffraction condition, where a lattice spacing d and an incident angle $\theta$ are parameters.

$$2d(\sin\theta) = m\lambda$$

m: integer (diffraction order)

In FIG. 2B, a reflected light beam H is emitted with a delay of $2d(\sin\theta)$, which is twice the distance (dsin $\theta$) indicated by a, from a reflected light beam G.

Figure 3A:
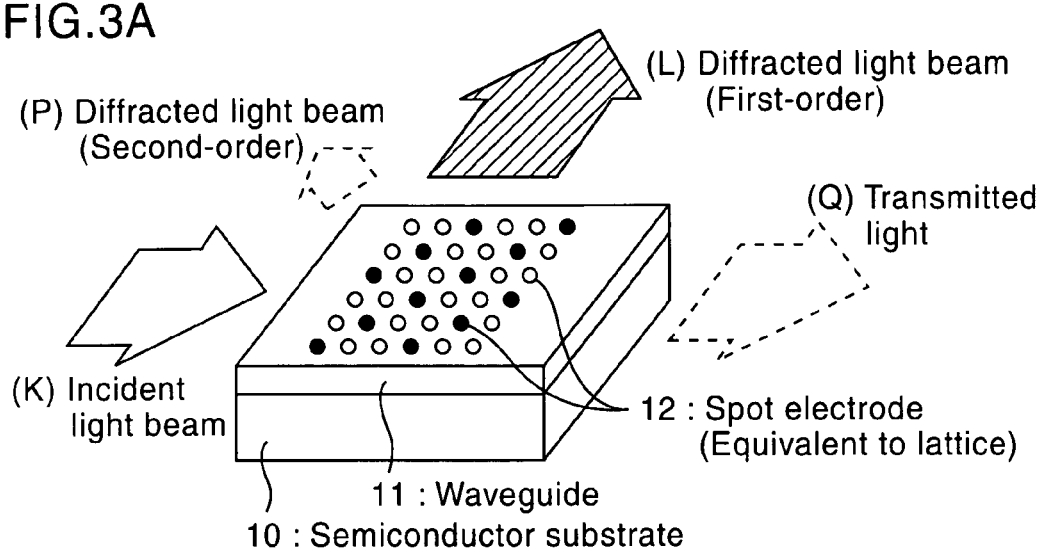
FIG. 3A is a perspective view showing an exemplary embodiment of the active diffraction grating according to this invention.
Figure 3B:
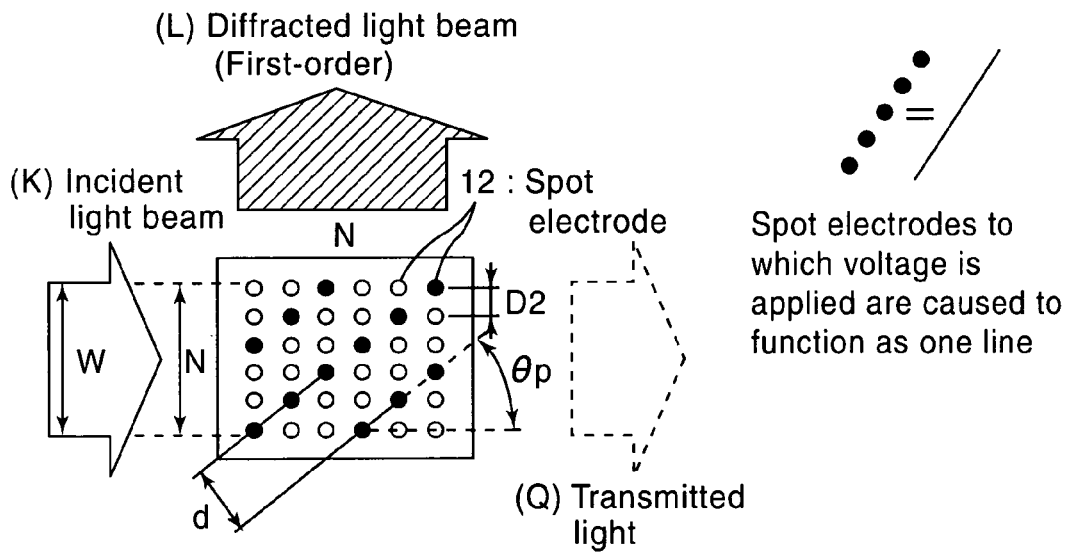
FIGS. 3B, 3C and 3D are two plan views and a sectional view of the embodiment, respectively.
Figure 3C:
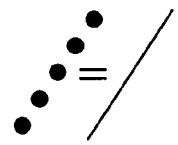
Figure 3D:
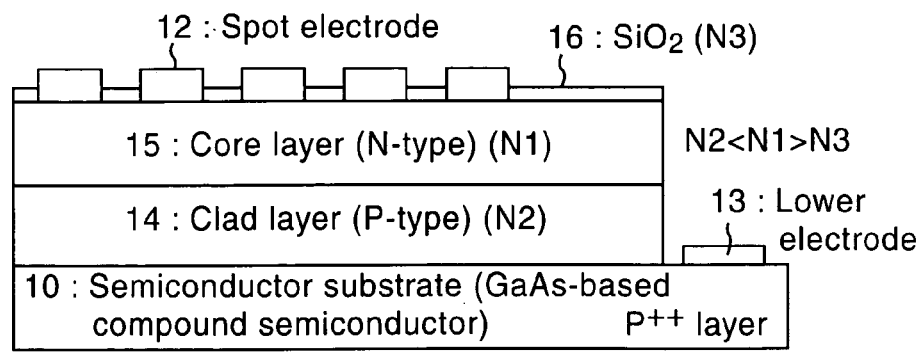

FIGS. 3A to 3C show an exemplary embodiment of this invention. FIG. 3A is an enlarged perspective view. FIG. 3B is a plan view thereof. FIG. 3C is an enlarged sectional view. In FIGS. 3A to 3C, a substrate 10 is made of, for example, a GaAs-based compound semiconductor of a rectangular shape. Its surface is a $P^{++}$ layer.

On the substrate 10, a clad layer 14 of P-type having a refractive index N2 is formed over the $P^{++}$ layer, and a core layer 15 of N-type having a refractive index N1 is formed over the clad layer 14, as shown in FIG. 3C.

A $SiO_2$ layer 16 having a refractive index N3 is formed over the core layer 15. In this $SiO_2$ layer 16, holes reaching the core layer 15 are formed in a matrix form and spot electrodes 12 are formed therein. With respect to the size of the spot electrodes 12 and the distance between the spot electrodes, many spot electrodes 12 are formed so that the spot electrodes function as lines within the diameter of light incident on an optical waveguide 11.

For example, as shown in FIG. 3B, in the case where the diameter W of a light beam is 2 μm and N spot electrodes 12, for example, ten spot electrodes 12, are arranged in straight lines, the size of the spot electrodes 12 and the distance D2 between the spot electrodes are 0.1 μm. In the case where 100 spot electrodes 12 are arranged, the size of the spot electrodes 12 and the distance between the spot electrodes are 0.01 μm.

FIG. 3C shows a state where spot electrodes to which a voltage is applied function as one line.

The length of the line formed by the spot electrodes 12 is sufficiently longer than the diameter of the incident light so that it can cope with deviations in position of incidence of incident light, differences in diameter of light beams and the like.

The refractive index N1 of the core layer 15, the refractive index N2 of the clad layer 14 and the refractive index N3 of the $SiO_2$ layer 16 are in the relation of N2<N1>N3. A lower electrode 13 is formed on the $P^{++}$ layer of the substrate 10, and this $P^{++}$ layer functions as the lower electrode.

Although not shown in the drawings, a voltage application device for applying a voltage between each of the spot electrodes 12 and the lower electrode 13 is provided.

In FIGS. 3A to 3D, a voltage is applied to spot electrodes indicated by black spots that have an angle θp to the traveling direction of an incident light beam K, of the N spot electrodes 12 arranged in the matrix form, and the lower electrode 13. Corresponding to the electrodes, to which the voltage is applied, changes in refractive index (lowering of refractive index) occur in the form of straight lines in the optical waveguide 11.

In this case, the light becomes equivalent to the phenomenon shown in FIGS. 2A and 2B and first-order diffracted light of m=1 is emitted in the direction of arrow L in accordance with the Bragg diffraction condition ($2d(\sin \theta)=m\lambda$). Second-order light of m=2 is emitted, for example, in the direction of arrow P (see FIG. 3A).

When no voltage is applied to the spot electrodes 12, light is emitted as transmitted light in the direction of arrow Q.

Even in the case where a voltage is applied to the spot electrodes 12, transmitted light is slightly emitted in the direction of arrow Q as a leakage of diffracted light, as shown in FIGS. 3A and 3B.

Figure 4A:
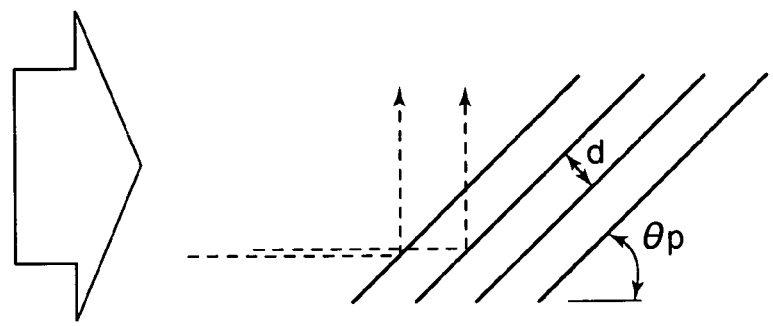
FIGS. 4A to 4D are views showing operating parameters of the active diffraction grating according to this invention.

FIGS. 4A to 4D are views showing operating parameters of the diffraction grating of this invention shown in FIGS. 3A to 3D. FIG. 4A shows an example in which four straight lines having an angle θp to the traveling direction of incident light are formed. The more such lines are formed (for example, several hundred to several thousand), the stronger the output of diffracted light can be.

Figure 4B:
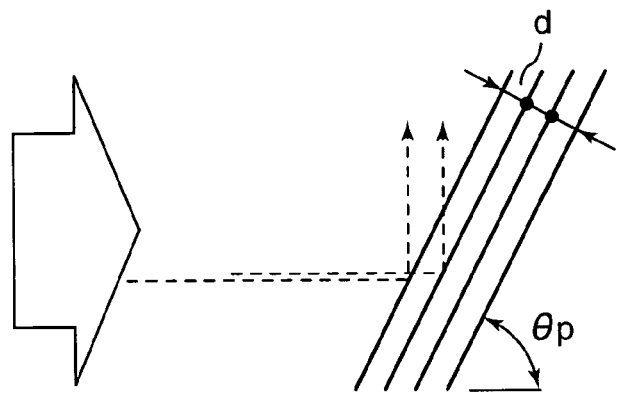

In FIG. 4B, the width d between lines and the angle θp are simultaneously controlled so as to guide diffracted light to a certain fixed output port when the wavelength of light is unknown, compared with FIG. 4A.

Figure 4C:
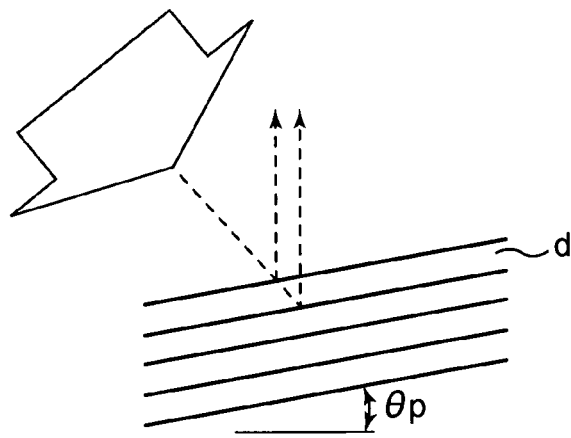

In FIG. 4C, the width d between lines and the angle θp are simultaneously controlled so as to guide diffracted light to a certain fixed output port when the direction of incidence of light is unknown, compared with FIG. 4A.

Figure 4D:
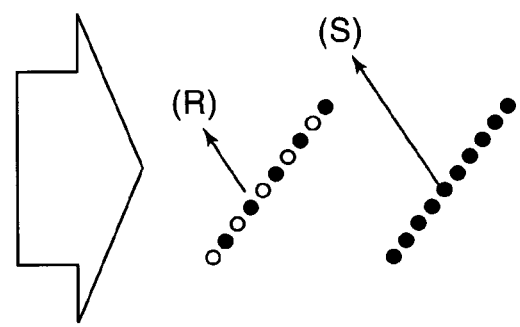

FIG. 4D shows that it is possible to adjust the intensity of diffracted light by increasing or decreasing the density of the spot electrodes that form lines corresponding to the width of an incident light beam. A line R represents the state where a voltage is applied to very other spot electrode. A line S represents the state where a voltage is applied to all the spot electrodes on the line.

Figure 5:
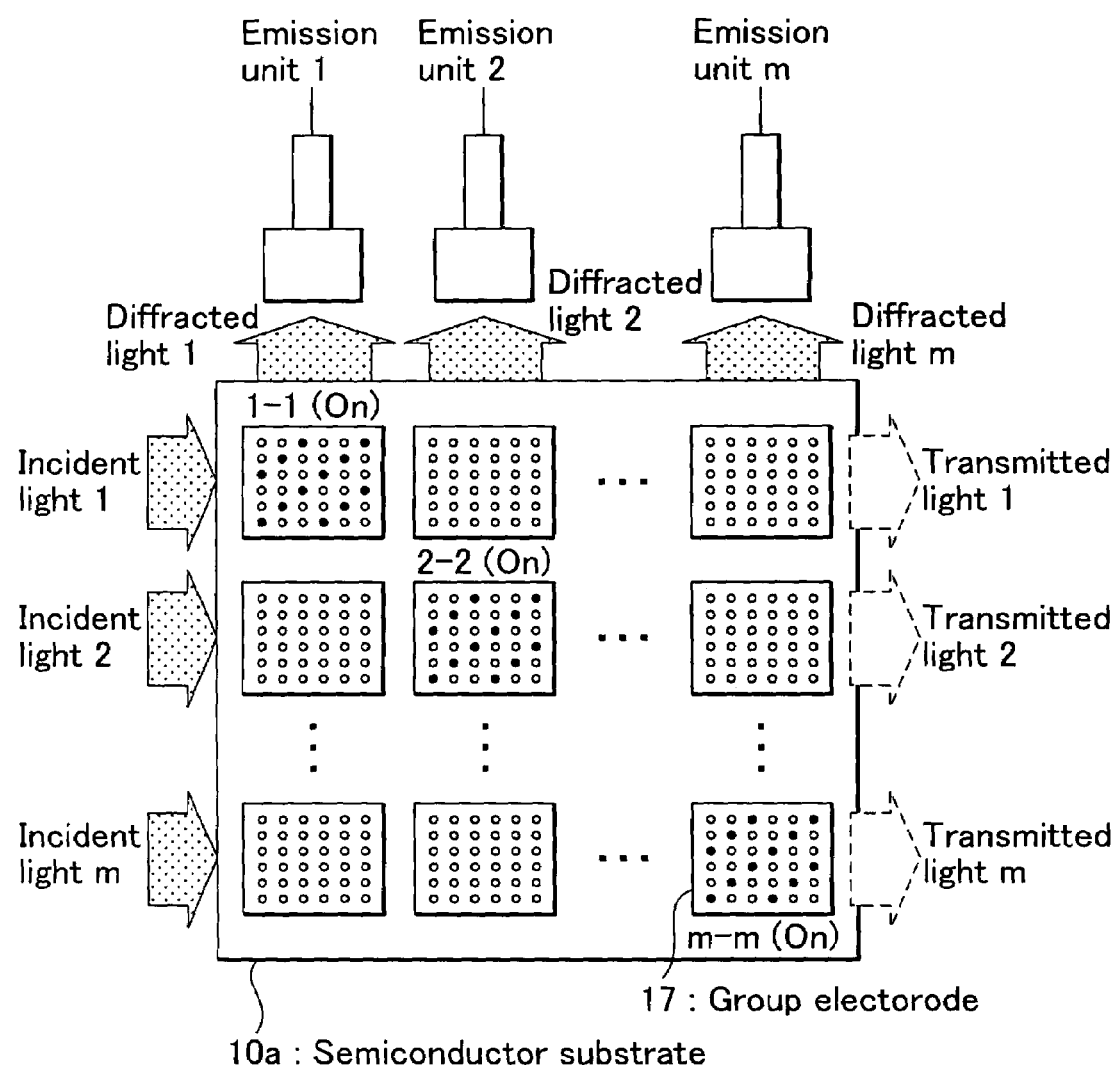
FIG. 5 is a plan view showing an exemplary application of the active diffraction grating of this invention.

FIG. 5 is a plan view showing an exemplary application of this invention. In FIG. 5, a semiconductor substrate 10a is a semiconductor substrate constructed similarly to the substrate shown in FIG. 3. Around a two-dimensional plane of this substrate 10a, m incidence units and m emission units (1 to m) are arranged. Incident light beams (1, 2 ..., m) from the incidence units become incident on a waveguide (see FIG. 3) formed on the substrate 10a.

1—1 to m—m represent group electrodes 17, each of which has plural spot electrodes formed in a matrix form as a unit. These group electrodes 17 are formed at cross points on the optical waveguide where lines extending from the incidence and emission units intersect each other.

A light beam is made incident on an arbitrary incidence unit, and a voltage is applied to arbitrary spot electrodes of the group electrodes 17 formed at the cross points. Plural spot electrodes of the spot electrodes arranged in the matrix form are selected and a voltage is applied to the selected spot electrodes so that at least two parallel lines having a predetermined angle to the traveling direction of the light incident on the optical waveguide are formed. Then, when the light incident on the two-dimensional plane waveguide is reflected by at least two parallel lines, the refractive index of the optical waveguide is partly changed so that the wavelength of the light, the angle of at least two lines to the incident light and the distance between the lines satisfy the Bragg reflection condition.

As a result, the diffracted light is emitted to an arbitrary emission unit. In FIG. 5, the incident light beam 1 incident on the group electrode 1—1 is emitted to the emission unit 1. The incident light beam 2 incident on the group electrode 2—2 is emitted to the emission unit 2. The incident light beam m incident on the group electrode m—m is emitted to the emission unit m.

When no voltage is applied to the group electrodes 17, incident light becomes transmitted light. Even when a voltage is applied, leakage of diffracted light is transmitted. In FIG. 5, transmitted light beams 1, 2, m are generated as leakage light beams in either case.

Although not shown, a voltage control unit using an algorithm function for realizing optimum control is used as a measure for applying voltage to the group electrodes 17, in order to selectively make diffracted light incident on an arbitrary emission unit from an arbitrary incidence unit. As a result, from light coming from an incidence unit, diffracted light can be acquired on an arbitrary emission unit at a high speed with reduced loss.

The above description of this invention is simply the description of the specific preferred embodiment for the purpose of explanation and illustration. Therefore, it should be understood by those skilled in the art that various changes and modifications can be made without departing from the scope of this invention. For example, though m incidence units and m emission units are used in the embodiment, the number of incidence units and the number of emission units need not be equal. The scope of this invention defined by the claims includes such changes and modifications.

As is specifically described above using the embodiment, the active diffraction grating according to this invention comprises an optical waveguide formed on a two-dimensional plane and plural spot electrodes formed at a constant spacing in a matrix form on the two-dimensional plane. With respect to the size of the spot electrodes and the distance between the spot electrodes, the spot electrodes are small and dense enough to function as a line when the spot electrodes are arrayed in a straight line within the diameter of light incident on the optical waveguide.

A voltage is applied to arbitrary spot electrodes to partly change the refractive index of the optical waveguide. Plural spot electrodes of the spot electrodes arranged in the matrix form are selected so that at least two parallel lines having a predetermined angle to the traveling direction of the light incident on the optical waveguide are formed. A voltage is applied to the spot electrodes so that an angle satisfying the Bragg reflection condition is provided when the light incident on the two-dimensional plane waveguide is reflected by at least two parallel lines. As a result, an active diffraction grating that can freely control the direction of diffraction and the intensity of diffracted light can be realized.

Moreover, m incidence units and m emission units are arranged around the two-dimensional plane, and group electrodes are formed, each of which has plural spot electrodes arranged in a matrix form as a unit. The group electrodes are arranged at cross points on the optical waveguide where lines extending from the incidence and emission units intersect each other. As a voltage applied to an arbitrary group electrode of the group electrodes formed at the cross points is controlled so as to change the refractive index at the parts where the spot electrodes are formed, light incident on an arbitrary incidence unit is emitted from an arbitrary emission unit.

In order to selectively emit light from an arbitrary incidence unit to an arbitrary emission unit, an algorithm for realizing optimum control of the voltage applied to the group electrode is used. Therefore, it is possible to realize an active diffraction grating that has a high degree of freedom in control, small size and high reliability, and that is flexible enough to cope with changes in the quantity of communications and communication failure.

What is claimed is:

1. An active diffraction grating comprising an optical waveguide formed on a two-dimensional plane and electrodes formed on both sides of the optical waveguide, wherein one of the electrodes is formed as plural spot electrodes at a constant spacing in a matrix form on the two-dimensional plane, and with respect to the size of the spot electrodes and the distance between the spot electrodes, the spot electrodes are small and dense enough to function as a line when the spot electrodes are arrayed in a straight line within the diameter of light incident on the optical waveguide, and wherein plural spot electrodes of the spot electrodes arranged in the matrix form are selected and a voltage is applied thereto so as to form at least two parallel lines having a predetermined angle to the traveling direction of the light incident on the optical waveguide, and when the light incident on the two-dimensional plane waveguide is reflected by said at least two parallel lines, the refractive index of the optical waveguide is partly changed so that the wavelength of the light, the angle of said at least two lines to the incident light and the distance between the lines satisfy a Bragg reflection condition.

2. The active diffraction grating as claimed in claim 1, wherein the optical waveguide comprises a semiconductor core layer doped with n-type (or p-type) and a clad layer doped with p-type (or n-type), and at least one of the electrodes formed on both sides of the optical waveguide is formed as spot electrodes.

3. The active diffraction grating as claimed in claim 1 or 2, wherein plural incidence units and plural emission units are arranged around the two-dimensional plane, and plural group electrodes are formed, each of which has plural spot electrodes of the spot electrodes arranged in the matrix form as a unit, the plural group electrodes being arranged at cross points on the optical waveguide where lines extending from the plural incidence and emission units intersect each other, and a voltage applied to spot electrodes of an arbitrary group electrode of the group electrodes arranged at the cross points is controlled to change the refractive index at the parts where the spot electrodes are formed, so that diffracted light of light incident on an arbitrary incidence unit becomes incident on an arbitrary emission unit.

4. The active diffraction grating as claimed in claim 3, wherein an algorithm function for realizing optimum control is used as a measure for applying a voltage to the group electrode.

* * * * *